United States Patent [19]
Madigan

[11] 3,986,118
[45] Oct. 12, 1976

[54] SIMPLIFIED WHEEL SPEED TRANSDUCER
[75] Inventor: Basil M. Madigan, Wadsworth, Ohio
[73] Assignee: Goodyear Aerospace Corporation, Akron, Ohio
[22] Filed: May 2, 1975
[21] Appl. No.: 574,154

[52] U.S. Cl. .............................. 324/174; 310/155; 310/168
[51] Int. Cl.² ..................... G01P 3/48; H02K 17/42
[58] Field of Search ............ 324/167, 174; 310/155, 310/168, 169, 170, 171

[56] References Cited
UNITED STATES PATENTS

| | | | |
|---|---|---|---|
| 3,473,120 | 10/1969 | Ruof | 324/70 |
| 3,604,965 | 9/1971 | Stroud | 310/155 |
| 3,678,386 | 7/1972 | Miles | 324/174 |
| 3,870,911 | 3/1975 | Toyama et al. | 310/155 |

Primary Examiner—Robert Segal
Assistant Examiner—Vincent J. Sunderdick
Attorney, Agent, or Firm—J. G. Pere; P. E. Milliken; E. W. Oldham

[57] ABSTRACT

A wheel speed transducer for sensing the rotational speed of a wheel about an axle which fundamentally includes a housing fixed to the axle and containing therein two permanent magnets. The magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. There are further provided two additional pole pieces, one connected to the end of each of the cores opposite the ends of the cores which abut the magnets.

6 Claims, 2 Drawing Figures

U.S. Patent   Oct. 12, 1976   3,986,118

SIMPLIFIED WHEEL SPEED TRANSDUCER

BACKGROUND OF THE INVENTION

Heretofore, numerous types of electric pulse generators, tachometers and the like have been known and utilized for various purposes. In the sensing and control of skidding activity of vehicles during braking, several types of wheel speed transducers have been incorporated in anti skid braking systems. Particularly, the aircraft industry has been known to associate a wheel speed transducer with each of the wheels or sets of wheels of an aircraft for monitoring the rotational speed of such wheels upon landing and during braking. Of necessity, the transducers associated with the wheels of the aircraft must be compact and as simplistic as possible for purposes of packaging and cost effectiveness. More importantly, the transducers must be efficient in operation and produce output signals which are highly resolvable with respect to wheel speed variations.

Consequently, it is an object of the instant invention to present a simplified wheel speed transducer which is more compact than those presently utilized in the art.

It is a further object of the invention to present a simplified wheel speed transducer which, while being of a compact nature, is highly efficient in operation and capable of producing output signals comparable to those created by presently existing transducers.

Yet another object of this invention is to present a simplified wheel speed transducer which is simplistic in design, inexpensive to construct, reliable in operation, and adaptable for implementation with presently existing systems.

These objects and other objects which will become apparent as the detailed description proceeds are achieved by a wheel speed transducer for sensing the rotational speed of a wheel about an axle, comprising: a housing adaptable for being fixedly secured to the axle; two permanent magnets received within the housing; at least one elongated pole piece commonly abutting a first surface of each of said magnets, said surfaces being of like polarity; two inductive coils having flux-conductive cores axially passing therethrough, each magnet being abutted by a core on a second surface thereof, the second surface of said magnets being of like polarity with respect to each other and of opposite polarity with respect to the first surfaces; and two pole pieces, one connected to the end of each of the cores opposite the ends of the cores abutting the magnets.

DESCRIPTION OF THE DRAWING

For a complete understanding of the structure of the invention, reference should be had to the following detailed description and accompanying drawing wherein.

DETAILED DESCRIPTION OF THE PREFERRED EMBODIMENT

The wheel speed transducers heretofore utilized in the art have most generally achieved compact packaging by providing a complex magnetic flux path between the active magnetic elements of the unit. Quite commonly, a single magnet is nested within the center of the transducer with pole pieces passing radially therefrom at the top and bottom thereof. The pole pieces, of course, are orthogonal to each other thus dividing the unit into quadrants. However, the north and south poles of such units are in different planes from each other, being separated by the magnet interposed therebetween. Hence, the magnetic path between poles is not uniplanar, but indeed takes a path through the magnet interconnecting the two poles and perpendicular thereto, and further takes a path between the pole tips which is transverse to the planes of the poles. A problem inherently present in such units resides in the fringing around the magnet between the pole pieces. There is an extreme loss of utilization of magnetic energy due to such fringing. Of course, the center magnet may be shaped so as to reduce the fringing effect accordingly, but such shaping must be made only with due consideration given to the desired operation point along the demagnetization curve of the magnet used.

Figure 1:
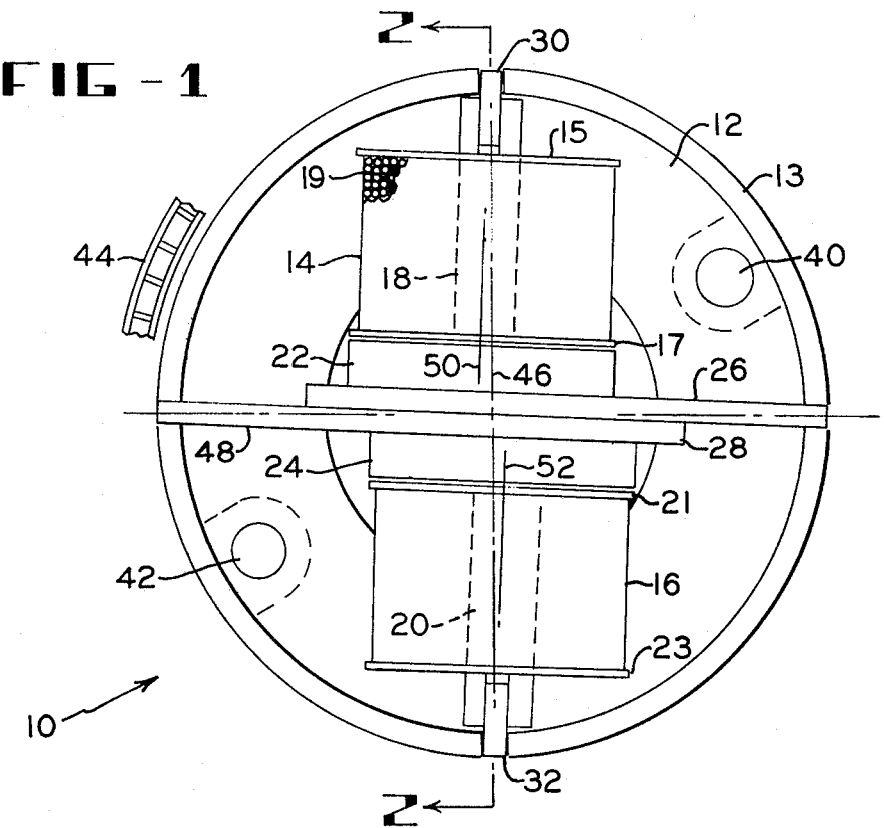
FIG. 1 is a top plan view of the transducer of the invention.
Figure 2:
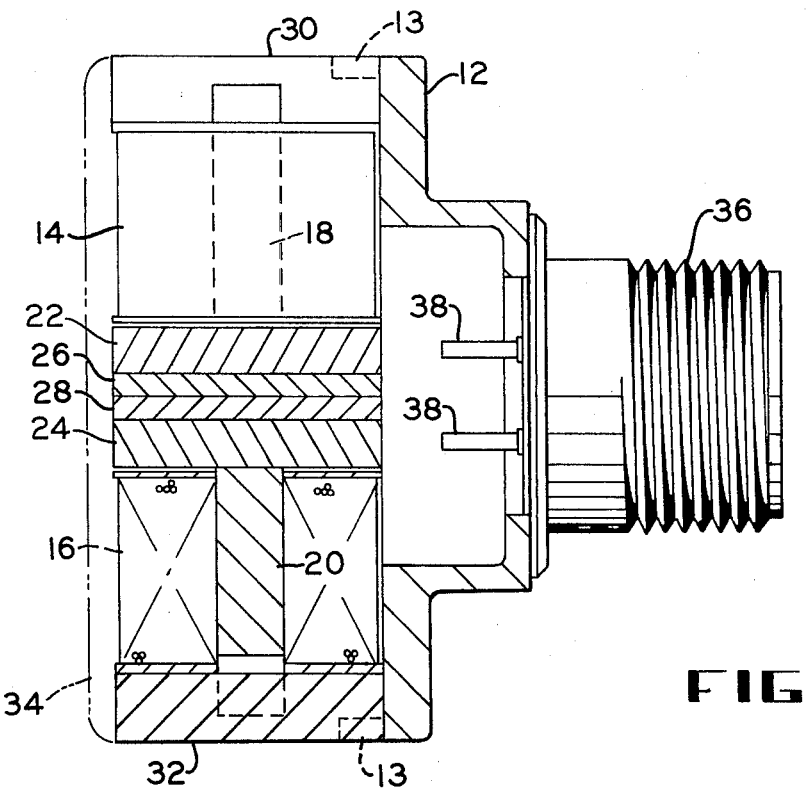
FIG. 2 is a cross-sectional view of the transducer of FIG. 1 taken along the line 2—2.

The structure of the instant invention as shown in FIGS. 1 and 2 achieves an optimum utilization of magnetic energy with substantially reduced fringing from those units presently used. The transducer unit of the invention has these desirable characteristics while maintaining a simplistic and compact unit design.

Referring now to FIG. 1, it can be seen that the transducer of the invention is designated generally by the numeral 10. A housing 12 having a short lip 13 extending about the circumference thereof is provided for receiving the ferromagnetic elements of the unit. Resting in the housing 12 and within the confines of the lip 13 thereof, are inductive coil assemblies 14, 16 respectively having cores 18, 20 extending axially therethrough. Cores 18, 20 are of a good magnetic flux conducting character and would preferably be of a soft iron construction. Permanent magnet disks 22, 24 are provided at facing ends of coils 14, 16 and in flux conducting relationship with the cores 18, 20. In accordance with the teachings of the invention, the disk magnets 22, 24 are of such nature as to have their north and south poles on opposite flat surfaces thereof with similar poles of the two magnets facing each other with pole pieces 26, 28 being interposed therebetween. Thus, the pole pieces 26, 28 take on the polarity of the similar faces of the magnets 22, 24 in contact therewith. The pole pieces 30, 32 are respectively connected in flux conducting relationship with the cores 18, 20 which are in contacting relationship with the other faces of the magnets 22, 24. Thus, the poles 26, 28 are of like polarity while the poles 30, 32 are of like polarity with respect to each other and opposite from the polarity of poles 26, 28.

The structure of the invention provides for magnetic flux paths between the north poles 30, 32 and south poles 26, 28 thereof. Portions of these paths are open, circumferentially surrounding the unit 10 through the quadrants defined by the pole pieces. The closed portions of the paths are defined by the pole pieces. The closed portions of the paths are defined by the pole pieces 26, 28 cores 18, 20, and pole pieces 30, 32. An exciter ring 44 is positioned in close-spaced circumferential relationship with the unit 10. The ring 44, of course, has a plurality of teeth thereon for varying the reluctance of the magnetic path between pole pieces as the paths exist exterior to the unit 10. The utilization of such an exciter ring in combination with flux paths between pole pieces is well known in the art and not elaborated upon herein. With the ring 44 being affixed to a rotating member such as, for example, the hub of a wheel, the rotation of the ring 44 is operative by virtue of varying the flux paths to induce current into the respective inductive coil assemblies 14, 16. Such current is induced into the magnet wire 19 which is wrapped about the core of the respective coil assemblies 14, 16 in the normal spool-like fashion. For purposes of retaining the wrapped magnet wire 19, the assemblies 14, 16 are respectively provided with end plates 15, 17 and 21, 23. The magnet wire 19 of the spool assemblies 14, 16 is continuous such that the ends thereof, one from the coil 14 and the other from the coil 16, are attached to the connector lugs 38 as shown in FIG. 2. The alternating current signals induced into the coils by virtue of the excitation of the magnetic field by the rotating exciter ring 44 is thus evidenced at the connector lugs 38 for use by appropriate breaking circuitry.

As can be seen in FIG. 2, a threaded connector 36 having the aforementioned lugs 38 protruding therefrom is provided in secured relationship to the housing 12. This connector 36, is, of course, adaptable for interconnection with a mating connector for transfer of the induced signal to appropriate circuitry. There is also applied to the unit of the invention an epoxy 34 or other plastic filler to securely maintain the various elements of the unit 10 in their proper position and to cause such elements to be impervious to the effects of the atmosphere or ambient operating conditions.

It should now be seen that the structure of the invention as presented hereinabove provides for magnetic flux paths between the pole pieces and through the coil assembly cores which are uniplanar in nature and hence reduce the fringing effect heretofore encountered in the art. Such uniplanar paths allow the unit, when compared with prior art units, to be made of smaller physical size since the unit is more efficient because more flux lines pass through the functional loop between the pole pieces due to the reduction in fringing. Of course, the size of the magnets 22, 24 and the specific characteristics of the coils 14, 16 are selected for optimum operating condition with due consideration being given to physical size, since as is well known in the art, the shaping of the magnet, as to thickness and diameter, determines the point of operation along the demagnetization curve. It has been found that magnets of an aluminum nickle cobalt (alnico 8) composition may be utilized having such physical size as to operate on the optimum position along the demagnetization curve within the structure of the invention. Thus, the optimum energy available from the magnet is acquired.

It should be briefly noted with respect to the structure presented in the drawings that appropriate mounting elements 40, 42 are provided within the housing 12 for securing engagement of the unit 10 with a wheel axle. It should be further noted that, although a single pole piece could be utilized in place of the plural pole pieces 26, 28, the use of the overlapping pole pieces 26, 28 requires an offsetting of the coil assemblies 14, 16 with respect to each other. This is necessitated by the desirable feature of causing the center line 46 of the pole pieces 30, 32 to be perpendicular to the center line 48 or the pole pieces 26, 28. As can be seen, these center lines are the interconnection of the center points on the outermost edges of the pole pieces where the same are flush with the circumference of the unit 10.

since overlapping pole pieces 26, 28 are utilized, the center line 40 is skewed with respect to the center line of the physical elements 26, 28 themselves. Thus, the slight offsetting occurs. This offsetting is measured by the angle between the axis 50, 52 of cores 18, 20 and the center line 46.

If a single pole piece had been utilized in place of the pieces 26, 28 then it should be understood that the coils 14, 16 would align as would the center line 46 with the lines 50, 52.

Thus, it can be seen that the objects of the invention have been achieved by the structure presented hereinabove. While in accordance with the patent statutes only the best mode and preferred embodiment of the invention have been presented and described in detail, it is to be understood that the invention is not limited thereto or thereby. Consequently, for an appreciation of the scope and breadth of the invention reference should be had to the following claims.

The embodiments of the invention in which an exclusive property or privilege is claimed are defined as follows:

1. A wheel speed transducer for sensing the rotational speed of a wheel about an axle, comprising:
   a housing adaptable for being fixedly secured to the axle;
   two permanent magnet disks received within the housing;
   at least one elongated pole piece commonly abutting a first surface of each of said magnet disks, said surfaces being of like polarity;
   two inductive coils have flux-conductive cores axially passing therethrough, each magnet disk being abutted by a core on a second surface thereof in substantially perpendicular relationship therewith, the second surface of said magnet disks being of like polarity with respect to each other and of opposite polarity with respect to the first surfaces; and
   two pole pieces, one connected to the end of each of the cores opposite the ends of the cores abutting the magnet disks.

2. The wheel speed transducer as recited in claim 1 wherein the ends of the elongated pole piece and ends of the two pole pieces are circumferentially aligned.

3. The wheel speed transducer as recited in claim 2 which further includes an exciter ring rotatable about the ends of the pole pieces in fixed close positional relationship thereto, the exciter ring having a plurality of teeth for making and breaking flux paths between the ends of the pole pieces, and the ends of the pole pieces being uniformly circumferentially spaced.

4. The wheel speed transducer as recited in claim 1 wherein magnetic flux paths between the pole pieces and coil cores are uniplanar.

5. The wheel speed transducer as recited in claim 1 wherein two elongated pole pieces are provided in overlapping relationship to each other, one such pole piece abutting the first surface of one magnet and the other said pole piece abutting the first surface of the other magnet.

6. The wheel speed transducer as recited in claim 1 wherein the reductive coils are wrapped with wire, the wire of the two coils being continuous such that a first wire end is provided from one coil and a second wire end is provided from the other coil.

\* \* \* \* \*